United States Patent [19]

Liu

[11] Patent Number: 4,617,328
[45] Date of Patent: Oct. 14, 1986

[54] BIOCIDAL AGENTS FOR USE IN PLASTICS, POLYMERS AND CELLULOSIC MATERIALS

[75] Inventor: Sophia Y. Liu, Fremont, Calif.

[73] Assignee: Stauffer Chemical Company, Westport, Conn.

[21] Appl. No.: 793,877

[22] Filed: Nov. 1, 1985

Related U.S. Application Data

[63] Continuation of Ser. No. 641,622, Aug. 17, 1984, abandoned, which is a continuation of Ser. No. 221,120, Dec. 29, 1980, abandoned.

[51] Int. Cl.$^4$ ................................................. C08K 5/41
[52] U.S. Cl. ................................ 523/122; 106/18.33; 524/172
[58] Field of Search ................. 523/122; 424/304, 78, 424/82, 83; 106/18.33; 524/172; 514/520

[56] References Cited

U.S. PATENT DOCUMENTS

| | | | |
|---|---|---|---|
| 3,140,307 | 7/1964 | Heininger et al. | 424/304 |
| 3,159,532 | 12/1964 | Heininger et al. | 424/304 |
| 3,214,453 | 10/1965 | Stern | 260/429.7 |
| 3,242,041 | 3/1966 | Aichenegg et al. | 424/337 |
| 3,541,119 | 11/1970 | Richter et al. | 424/304 |
| 4,206,235 | 6/1980 | Vofsi et al. | 523/122 |
| 4,331,480 | 5/1982 | Gutman et al. | 424/304 |
| 4,363,663 | 12/1982 | Hill | 523/122 |

OTHER PUBLICATIONS

The Condensed Chemical Dictionary—10th edition Gessner G. Hawley, editor, Van Nostrand Reinhold Co. 1981.

*Primary Examiner*—Veronica P. Hoke
*Attorney, Agent, or Firm*—Joel G. Ackerman

[57] ABSTRACT

Compounds having the formula

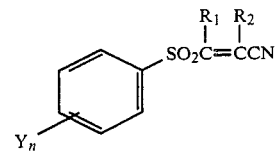

in which Y is hydrogen, halogen, or $C_1$–$C_4$ alkyl; $R_1$ and $R_2$ are independently hydrogen or methyl; and n is 1 or 2, are effective biocides or biostats for protection of plastic, polymeric or cellulosic materials against attack by microorganisms.

19 Claims, No Drawings

BIOCIDAL AGENTS FOR USE IN PLASTICS, POLYMERS AND CELLULOSIC MATERIALS

This is a continuation of application Ser. No. 641,622, filed Aug. 17, 1984, now abandoned, which in turn is a continuation of application Ser. No. 221,120, filed on Dec. 29, 1980, now abandoned.

BACKGROUND AND PRIOR ART

This invention relates to the protection of plastics, polymeric materials, and cellulosic materials against attack by microorganisms.

Synthetic, film-forming materials such as those used in the manufacture of plastic or polymeric films, and various types of plastics or polymers, are known to be subject to attack by microorganisms. Such microorganisms include bacteria, fungi and actinomycetes. The last mentioned are microorganisms found in soil which contain no chlorophyll. They are usually classified with the bacteria, but resemble both bacteria and fungi; they are intermediate in size between fungi and bacteria.

Such microorganisms attack plastics and polymers and can cause damage or deterioration ranging from discoloration and staining to embrittlement or actual disintegration, depending on the type of plastic or polymer, and the environment in which it is situated. Severe damage can be produced to plastics or polymers which are utilized in certain environments, such as those with high humidity. Plastics and polymers are commonly used for instance, in underground construction, in pipes and conduits, cables, sheathing, insulation, etc. In such an environment, they are subject to severe deterioration by soil-borne microorganisms. Similarly, plastics and polymers used in materials such as swimming pool liners, awnings, camping equipment, and other articles for outdoor use, and in upholstery, car tops, shoes, boots and clothing, in which they may be exposed to natural humidity and/or sweat, possibly in combination with somewhat elevated temperatures, and subject to microbial deterioration.

In addition to physical deterioration of plastics and polymers, microorganisms growing on the surface of such materials can cause discoloration and/or staining thereof resulting in a shortening of the useful life of said materials for at least aesthetic purposes. Actinomycetes, in particular, growing on the surfaces of plastics and polymers can produce colored byproduct dyes which are soluble in the plasticizers used in such substances, and which migrate through the substance via the plasticizer, resulting in the phenomenon known as "pink staining." In addition, surface growth of microorganisms on polymers may interfere with functional performance, for instance when used as lubricating surfaces.

In order to prevent attack and deterioration or discoloration of polymeric or plastic materials by microorganisms, a number of compounds have been used as industrial biocides.

For use as a biocide in connection with plastics and polymers, a compound must have the following properties:

effectiveness at low levels against many microorganisms;

compatibility with plasticizers and other chemicals used in the formulation of plastic and polymeric products;

lack of a disadvantageous color or odor;

resistance to leaching from plastic or polymeric materials;

and particularly;

(a) thermal stability at temperatures over 300° F. (148° C.) so that deterioration of the biocide does not occur during the processing of plastics and polymers;

(b) mobility—the ability to migrate through the plastic, polymer or plasticizer utilized therein, so as to be dissipated therethrough; and (c) stability towards ultraviolet and other light radiation.

Such properties are necessary for plastics and polymers which are cast, rolled, molded, extruded, or otherwise fabricated into a continuous form, for use in various ways such as raw materials for the manufacture of plastic or polymer articles or as plastic or polymeric coatings, as well as plastics and polymers which are knitted or woven into continuous fibers.

Similarly, cellulosic materials, such as cotton and other fibers are subject to damage or deterioration by microorganisms; industrial biocides have been used to protect such materials, and articles formed from them, from microbial deterioration. Properties such as stability toward ultraviolet light and heat are also required of biocides for such materials.

Both the prevention of growth in the contact area, that is on the material itself, and inhibition of growth in a zone surrounding the contact area, are of importance in order to prevent the spread of an actively growing organism. The biocide must possess a positive antimicrobial activity in a zone of inhibition surrounding the article; otherwise, a compound which is effective as a biocide in the contact area itself would nevertheless not control heavy growth on the surface or on substances associated with or attached to the material. Such property is important, for instance, for fabrics in which a polymeric fiber, such as a polyester or polyamide, is laminated to a cotton or other cellulosic backing such as canvas.

Many of the industrial biocides currently used in connection with plastics, polymers and cellulosic fibers are organometallics. These compounds are effective in preventing microbial attack on such materials. However, such compounds may be suspect for reasons of toxicity or environmental effect and problems caused by their handling and are now less accepted in some of the industrial uses in which they have hitherto been employed. It has thus become desirable to find new, non-metallic biocides for use with such materials.

SUMMARY OF THE INVENTION

In brief, this invention comprises a method of protecting a cellulosic, plastic or film-forming polymeric composition, fabricated into a continuous form, comprising incorporating into such composition or form a microbiocidally effective amount of a compound having the formula

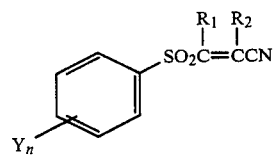

in which Y is hydrogen, $C_1$–$C_4$ alkyl or halogen; $R_1$ and $R_2$ are independently hydrogen or methyl; and n is 1 or 2. Additionally, this invention relates to such compositions containing or coated with a microbiocidally effective amount of such a compound.

The term "film-forming" is meant to refer to polymeric particles, whether present as dry particulate matter, or in liquid, dissolved, suspended, continuous, or any other form, particularly including the ultimate form for which such particles are designed. The term "plastic" is similarly intended to be regarded as a broad term and is to be understood to include polymeric materials which can be cast, extruded, injection molded, or compression molded into a desired state.

Certain polymers such as alkyd resins, polyester based urethanes, polyesters, and certain cellulosic polymers such as benzyl-, methyl-, hydroxyethyl-, and sodium carboxymethyl-cellulose, are susceptible in and of themselves to attack by microorganisms. Other polymers such as polyethylene and polystyrene may become susceptible after degradation through prolonged weathering. Still other plastics and polymers, such as polyvinyl chloride, are considered in and of themselves to be generally resistant to such attack. However, many substances utilized with polymers to produce polymeric or plastic products, for instance, flexible polyvinyl chloride sheeting, contain additives such as plasticizers, stabilizers, fillers, lubricants, thickening agents or starch sizings for synthetic fibers, which are susceptible to attack by microorganisms. Thus, plastics or other materials formulated from a polymer resistant to such attack but incorporating a substance such as a plasticizer, which is susceptible to such attack, are thereby rendered susceptible to deterioration, discoloration, and other damage from microorganisms. Alternatively, microorganisms can grown on debris, lubricants, or other materials adhering to the surface of a non-susceptible plastic or polymer. Metabolic products of such organisms may cause etching of the substrate material.

The compounds which have been found to be biocides for use with cellulosic materials, plastics and polymers are those having the formula

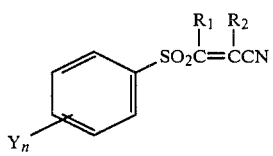

in which Y is hydrogen, $C_1$-$C_4$ alkyl or halogen; $R_1$ and $R_2$ are independently hydrogen or methyl; and n is 1 or 2. Preferably the group Y is located para to the sulfonyl moiety. The term "halogen" includes chloro, bromo, iodo and fluoro, and preferably indicates chloro, bromo, or fluoro. The most preferred compound is that in which Y is p-methyl. Other preferred compounds are those in which Y is p-chloro, p-fluoro, or hydrogen. These compounds are disclosed in U.S. Pat. Nos. 3,159,532 and 3,159,666 of Heininger, et al., as part of a series of aryl sulfonyl alkene nitriles. As shown in those patents, these compounds are effective microbiocides for use in agricultural environments, particularly as soil microbiocides, and showed activity in vitro against a number of fungi and bacteria. Also mentioned with respect to the p-methyl compound is soap bacteriostatic and paint preservative activity. No mention is made in these patents of any utility with respect to plastics, polymers, or cellulosic fibers.

For use as an agricultural biocide, compounds must possess a necessary short term, ephemeral activity, as agricultural biocides must not leave residues in either the soil or the plants which have been treated. The properties necessary for use as a plastic, polymer or cellulosic material biocide are different, however, from those required for effectiveness of an agricultural biocide. As pointed out above, particularly for use as plastics or polymer biocides, compounds must possess high thermal stability, ultraviolet radiation stability, and the ability to migrate through the plastic. Such properties are not necessarily possessed by compounds which are soil fungicides, nor are such properties required of, or necessarily possessed by compounds which are used as biocides for soap and for preservation of paint.

The compounds to which the present invention relates have been found to possess surprisingly high thermal stability, with the p-methyl compound being thermally stable at 250° C. They have been found to possess the necessary, unexpected ability to migrate through plastics, and the requisite, surprisingly high stability to ultraviolet radiation.

Tests were performed on a number of compounds falling within the generic class defined by the formula given above. These compounds are described in Table 1.

TABLE 1

$$\text{Y}_n\text{-C}_6\text{H}_4\text{-SO}_2\text{CH}=\text{CHCN}$$

| Compound No. | $Y_n$ |
| --- | --- |
| 1 | 4-$CH_3$ |
| 2 | 4-Cl |
| 3 | 4-sec.$C_4H_9$ |
| 4 | 4-F |
| 5 | H |
| 6 | 2,5-Cl |

To determine the suitability of the compounds as biocides for these materials, tests were performed as described below.

(A) THERMAL STABILITY

Compound 1 was tested for thermal stability using a PerkinElmer DSC-2 differential scanning calorimeter. Samples of solid compound weighing between 5 and 20 mg were sealed into stainless steel pans and heated at a rate of 5.0° C./min. from 40° C. to 250° C. Thermograms of the compound's physical state were plotted against change in temperature. All showed approximately the same properties: a small endothermic transition occurring at about 75° C. and melting at between about 125°-135° C. Over the entire range tested, up to 250° C., there was no evidence of any unusual thermal instability.

(B) MICROBIAL RESISTANCE SCREENING TEST (PLASTICS/POLYMERS)

Compound 1 was utilized in this test. A dry powdered blend of polyvinyl chloride was prepared by dry mixing of the following ingredients (by weight): 100 parts Dia 450 polyvinyl chloride resin (Diamond Shamrock Chemical Corporation), 40 parts dioctyl phthalate plasticizer, 3.50 parts Mark KCB cadmium-barium-zinc heat stabilizer/lubricant, 1.50 parts Mark C organic phosphite heat stabilizer/lubricant (Mark chemicals available from Argus Chemical Division, Witco Chemical Co.), 0.25 parts stearic acid and 7.6 parts epoxidized soybean oil (plasticizer/stabilizer). This composition was then fluxed on hot rollers at 320° F. (160° C.) until homogeneously blended. Then a sufficient quantity of solid Compound 1 was added, to provide a composition containing 1.0% weight of this compound. The composition was further milled for ten minutes, at this temperature, then sheeted off as a film.

Samples of the film thus prepared were submitted to 100 hours of exposure treatment, in a xenon arc-type weatherometer (weather-simulating exposure test apparatus) programmed for continuous light with 18 minutes of water spray every two hours. The exposure was conducted according to ASTM Standard G26-70.

Prior to exposure, and after 100 hours of exposure, samples of the films containing the test compound were tested for anti-microbial effect by the following procedure: The samples were placed on a nutrient agar inoculated with the test organism. Those samples inoculated with bacteria or actinomycetes were incubated for 24 hours at 37° C., samples inoculated with fungi were incubated 14 days at 28° C. After the incubation period, the anti-microbial activity was evaluated by measuring (in millimeters) the size of the clear zone of no growth around the sample, and rating the degree of growth or stain visually.

The organisms utilized in the tests were:

BACTERIA

*Staphylococcus aureus:* 209 ATCC 6538
*Klebsiella pneumoniae:* ATCC 4352
*Pseudomonas aeruginosa:* ATCC 13388
*Bacillus subtilus:* ATCC 7799

ACTINOMYCETES

*Stv. recticulum:* ATCC 25607 (pink staining organism)

FUNGI

A mixed fungal spore suspension of:
*Aspergillus niger:* ATCC 9642
*Aspergillus flavus:* ATCC 9643
*Penicillium funiculosum:* ATCC 9644
*Chaetomium globosum:* ATCC 6205

The results of these tests are shown in the following Table II.

TABLE II (ZONE OF INHIBITION, MM/GROWTH OR STAIN IN CONTACT AREA)

|  | Staph. aureus | K. pneum. | Pseud. aer. | Bac. Subt. | Pink Stain | Mixed Fungi |
|---|---|---|---|---|---|---|
| Unexposed | 10/N | 4/N | 0/G | 10/N | 7/NS | 1.2/N |
| 100 hrs. exposure | 9/N | 3/N | 0/G | 9/G | 6/NS | 0/N |

N — no growth in contact area
G — growth in contact area
NS — no staining

(C) ANTI-MICROBIAL SCREENING TESTS WITH ULTRAVIOLET AND WEATHER EXPOSURE (PLASTICS/POLYMERS)

Dry blends of polyvinyl chloride were prepared as in the previous tests with the exception that no epoxidized soybean oil was included. To one set of blends there was additionally added one part Mark 202A benzophenone ultraviolet light stabilizer. Thus, one set of blends contained an ultraviolet stabilizer, while the other set of blends was not stabilized against ultraviolet radiation.

The compounds in Table I above were incorporated into ultraviolet-stabilized and unstabilized polymer blends at levels of 0.5 and 1.0 weight % based on the polymer. The polymer was then milled into films for ten minutes at about 320° F. (160° C.) using hot rollers.

Films were then exposed in the weatherometer as in the previous test, for 100 and 300 hours of exposure.

Unexposed film, and film which had been exposed to the weather simulation for 100 and 300 hours, respectively, were tested for anti-microbial activity as follows:

(a) Samples of film which had been unexposed, exposed for 100 hours, and exposed for 300 hours were placed on samples of nutrient agar variously inoculated with bacteria, actinomycetes or fungi. The organisms were:

BACTERIA

*Staphylococcus aureus:* ATCC 6538 (gram-positive)
*Klebsiella pneumoniae:* ATCC 4352

ACTINOMYCETES

*Stv. reticulum:* ATCC 25607 (pink staining organism)

FUNGI

A mixed fungal spore suspension of:
*Aspergillus niger:* ATCC 9642
*Aspergillus flavus:* ATCC 9643
*Penicillium funiculosum:* ATCC 9644
*Chaetomium globosum:* ATCC 6205.

The samples inoculated with bacteria or actinomycetes were incubated for 24 hours at 37° C.; those containing fungi were incubated for 14 days at 28° C. After incubation, activity was evaluated by measuring the size of a clear zone of no growth (i.e., zone of inhibition) around each sample and visually rating the degree of fungal growth or stain on the sample.

(b) A second series of fungicidal tests was conducted using similar samples placed on agar containing non-nutrient mineral salts and inoculated with a mixed fungal spore suspension of: *Aspergillus niger*, ATCC 9642, *Penicillin funiculosum*, ATCC 9644, *Chaetomium globosum*, ATCC 6205, *Aureobasidium pullulans*, ATCC 9348, and *Trichoderma sp.*, ATCC 9645. The samples were incubated for 21 days at 28° C. (ASTM Standard method G. 21-75). Antifungal activity was evaluated by visually rating the degree of fungal growth on the samples.

The results of these tests are contained in the following Table III.

The samples were also visually examined for coloration, prior to exposure and after 100 hours of exposure. The results are contained in the following Table IV.

TABLE III

| Compound No. | Stabilized | Wt. % | Exposure, hrs. | Zone of Inhibition, mm/growth or staining | | | | |
|---|---|---|---|---|---|---|---|---|
| | | | | Staph. aureus | K. pneum. | Stv. ret. | Mixed fungi (a) | Mixed fungi (b) |
| 1 | − | 0.5 | 0 | 11/N | 3/N | 7/NS | 2/N | N |
| | − | 0.5 | 100 | 10/N | 2/N | 5/NS | 0-2/N | N |
| | − | 0.5 | 300 | 7/N | 1/N | 4/NS | 0/N | T |
| | + | 0.5 | 0 | 11/N | 3/N | 6/NS | 3/N | N |
| | + | 0.5 | 100 | 10/N | 2.5/N | 5/NS | 2/N | N |
| | + | 0.5 | 300 | 9/N | 1.5/N | 5/NS | 0/N | N |
| | − | 1.0 | 0 | 15/N | 6.5/N | 10/NS | 4/N | N |
| | − | 1.0 | 100 | 13/N | 5/N | 7/NS | 3/N | N |
| | − | 1.0 | 300 | 10/N | 4/N | 6/NS | 2/N | N |
| | + | 1.0 | 0 | 15/N | 6/N | 9/NS | 5/N | N |
| | + | 1.0 | 100 | 13/N | 5/N | 7/NS | 4/N | N |
| | + | 1.0 | 300 | 10/N | 4/N | 7/NS | 2/N | N |
| 2 | + | 0.5 | 0 | 11/N | 3/N | 6/NS | 3/N | N |
| | + | 0.5 | 100 | 10/N | 2.5/N | 5/NS | 2/N | N |
| | + | 0.5 | 300 | 9/N | 1.5/N | 5/NS | 2/N | N |
| | + | 1.0 | 100 | 10/N | 3/N | 8.5/NS | 0-1/NS | N |
| | + | 1.0 | 100 | 10/N | 2/N | 6/NS | 0/N | N |
| | + | 1.0 | 300 | 6/N | 1.5/N | 6/NS | 0/N | T |
| 3 | + | 0.5 | 0 | 4/N | 0/G | 3.5/NS | 0/T | L |
| | + | 0.5 | 100 | 4/N | 0/G | 2/NS | 0/T | L |
| | + | 0.5 | 300 | 3.5/N | — | 2.5/NS | 0/T | L |
| | + | 1.0 | 0 | 5/N | 0/G | 5/NS | 0/T | T |
| | + | 1.0 | 100 | 5/N | 0/G | 3/NS | 0/T | T |
| | + | 1.0 | 300 | 5/N | — | 4/NS | 0/T | T |
| 4 | − | 0.5 | 0 | 9/N | 6/N | 9/NS | 0/N | N |
| | − | 0.5 | 100 | 8/N | 2.5/N | 6/NS | 0/T | N |
| | − | 0.5 | 300 | 5/N | 1/N | 5/NS | 0/T | T |
| | + | 0.5 | 0 | 11/N | 6/N | 9/NS | 0/N | N |
| | + | 0.5 | 100 | 9/N | 4/N | 7/NS | 0/N | N |
| | + | 0.5 | 300 | 5/N | 1/N | 5/NS | 0/N | T |
| | − | 1.0 | 0 | 12/N | 6/N | 9/NS | 0/N | N |
| | − | 1.0 | 100 | 10/N | 5/N | 6/NS | 0/T | N |
| | − | 1.0 | 300 | 8/N | 2/N | 4/NS | 0/T | T |
| | + | 1.0 | 0 | 12/N | 8/N | 10/NS | 0/N | N |
| | + | 1.0 | 100 | 11/N | 6/N | 7/NS | 0/N | N |
| | + | 1.0 | 300 | 8/N | 3/N | 4/NS | 0/N | N |
| 5 | − | 0.5 | 0 | 14/N | 9/N | 10/NS | 1/N | N |
| | − | 0.5 | 100 | 13/N | 8/N | 10/NS | 0/N | N |
| | − | 0.5 | 300 | 10/N | 4/N | 8/NS | 0/N | N |
| | + | 0.5 | 0 | 13/N | 10/N | 11/NS | 0-1/N | N |
| | + | 0.5 | 100 | 13/N | 9/N | 9/NS | 0-1/N | N |
| | + | 0.5 | 300 | 9/N | 4/N | 4/NS | 0-1/N | N |
| | − | 1.0 | 0 | 19/N | 13/N | 14/NS | 8/N | N |
| | − | 1.0 | 100 | 14/N | 10/N | 10/NS | 5/N | N |
| | − | 1.0 | 300 | 12/N | 6/N | 10/NS | 4/N | N |
| | + | 1.0 | 0 | 19/N | 13/N | 17/NS | 9/N | N |
| | + | 1.0 | 100 | 16/N | 12/N | 12/NS | 4/N | N |
| | + | 1.0 | 300 | 12/N | 7/N | 9/NS | 3/N | N |
| 6 | + | 0.5 | 0 | 9/N | 2/N | 4/NS | 0-1/N | N |
| | + | 0.5 | 100 | 8/N | 2/N | 4/NS | 0-1/N | N |
| | + | 0.5 | 300 | 6/N | 1/N | 4/NS | 0-1/N | N |
| | + | 1.0 | 0 | 12/N | 3/N | 11/NS | 3/N | N |
| | + | 1.0 | 100 | 9.5/N | 2.5/N | 8/NS | 3/N | N |
| | + | 1.0 | 300 | 7/N | 1/N | 7/NS | 3/N | N |
| Control | + | 0 | 0 | 0/G | 0/G | 0/NS | 0/HG | HG |
| | + | 0 | 100 | 0/G | 0/G | 0/NS | 0/HG | HG |
| | + | 0 | 300 | 0/G | 0/G | 0/NS | 0/HG | HG |
| | − | 0 | 0 | 0/G | 0/G | 0/NS | 0/HG | HG |
| | − | 0 | 100 | 0/G | 0/G | 0/NS | 0/HG | HG |
| | − | 0 | 300 | 0/G | 0/G | 0/TS | 0/HG | HG |

Key:
N — No growth in contact area
T — Trace growth in contact area (less than 10%)
L — Light growth in contact area (10-30%)
G — Growth in contact area (30-60%)
HG — Heavy growth in contact are (>60%)
NS — No staining in contact area
TS — Trace of staining in contact area
+ — U.V. stabilizer included
− — no U.V. stabilizer

TABLE IV

| Compound | Wt. % | U.V. Stabilized | Color | |
|---|---|---|---|---|
| | | | No exposure | 100 hrs. exposure |
| 1 | 0.5 | − | C | C |
| | 1.0 | − | C | C |
| | 0.5 | + | C | C |
| | 1.0 | + | C | C |
| 2 | 0.5 | + | C | C |
| | 1.0 | + | C | C |

TABLE IV-continued

| Compound | Wt. % | U.V. Stabilized | Color No exposure | Color 100 hrs. exposure |
|---|---|---|---|---|
| 3 | 0.5 | + | T | Lt. T |
|  | 1.0 | + | Dk. T | Lt. T |

Key:
+ — U.V. Stabilizer included
− — U.V. Stabilizer not included
C — Colorless
T — Tan
Lt. — Light
Dk. — Dark Thus, formulations including Compounds 1 and 2 were highly stable toward ultraviolet radiation, as demonstrated by the fact that films containing these compounds did not become colored after exposure to ultraviolet light for 100 hours. With respect to Compound 1, stability towards such radiation existed even in the absence of an ultraviolet stabilizer in the formulation. Such stability towards ultraviolet radiation would not have been expected from the structure of these compounds. All the compounds contain an activated double bond, which would be expected to be oxidized in the presence of ultraviolet light and air.

(D) LONG-TERM EXPOSURE TEST

Compound 1 was utilized in this test. A dry powdered blend of polyvinyl chloride was prepared by dry mixing of the following ingredients (by weight): 100 parts Diamond Shamrock 450 polyvinyl chloride resin, 40 parts dioctyl phthalate plasticizer, 3.50 parts Mark KCB barium-cadmium-zinc heat stabilizer/lubricant, 1.5 parts Mark C organic phosphite heat stabilizer/lubricant, 1.0 part Mark 202A benzophenone ultraviolet stabilizer, 0.25 parts stearic acid and 7.6 parts epoxidized soybean oil (plasticizer/stabilizer). Compound 1 was added to samples of this blend in amounts so as to provide compositions containing 0.065, 0.25 and 1.0% by weight of this compound. The compositions were further mixed for ten minutes, then milled into a film on hot rollers at 320° F. (160° C.).

Samples of the films thus produced were placed out-of-doors at a location in Puerto Rico and exposed to the weather for 8–12 months, continuously. Visual evaluations of microbial growth on the surface of the films were made using a scale of from 0 to 5, with 0 representing no growth visible to the naked eye and 5 representing complete coverage. Results of these observations were as follows:

| wt % Compound 1 | 8 months | 12 months |
|---|---|---|
| 0 (control) | 4 | 5 |
| 0.065 | <1 | 4 |
| 0.25 | 0 | 4 |
| 1.0 | 0 | 0 |

(E) SOIL BURIAL TEST (COTTON FIBERS)

A solution of compound 1 in acetone was prepared, at a concentration of 0.62 weight %. The solution was applied to cotton twill fabric; the compound was applied at 0.5% by weight, based on the fabric sample. The treated fabric was placed horizontally on a 4-inch bed of compacted soil, covered with a 1-inch layer of loosely packed soil and placed in a humidity chamber maintained at 88° F. (31.1° C.) and 90% relative humidity. After 14 days, the sample was recovered and evaluated visually for deterioration. The fabric was observed to be in excellent condition with no evidence of any deterioration or microbial growth.

(F) ANTI-MICROBIAL SCREENING TEST

Samples of cotton twill coated with compound 1 as in test (E) were submitted to 24 hours of exposure treatment in an enclosed single carbon-arc fadeometer. Prior to exposure, the samples were tested for anti-bacterial and anti-fungal effect by the procedure described above in test (B). The results of these tests are shown in the following Table V.

TABLE V (Zone of inhibition, mm/growth or stain in contact area)

|  | Staph. aureus | K. pneum. | Pink stain | Mixed fungi |
|---|---|---|---|---|
| unexposed | >15/NG | 11–15/NG | 6–10/NS | 1–5/NG |
| 24 hrs exposure | >15/NG | 11–15/NG | 6–10/NS | 1–5/NG |

COMPARATIVE ACTIVITY TESTS

Commercial Agricultural and Soil Fungicides

As U.S. Pat. No. 3,159,532 indicates, the compounds in question have utility as soil fungicides. Several commercial agricultural and soil fungicides were tested by the above-described methods to ascertain whether any correlation could be determined between activity as a soil fungicide and activity as a biocide for plastics or polymers. The tests appeared to demonstrate a lack of any such correlation. In particular:

Cycloheximide, 3-[2-(3,5-dimethyl-2-oxacyclohexyl)-2-hydroxyethyl]glutaramide, tested as in (B) above, at 0.5 wt. %, provided essentially no control of the test organisms in the contact area, nor any zone of inhibition, both before and after exposure.

Thiram, bis(dimethylthio-carbamoyl)disulfide, tested as in (B) at levels of 0.5–2.0 wt. %, provided essentially no control of the test organisms in the contact area with the exception of the mixed fungal spore, and no zone of inhibition, with the exception of the mixed fungal spore at 2.0 wt. %, both before and after exposure.

Captafol, cis-N-[(1,1,2,2-tetrachloroethyl)thio]-4-cyclohexene-1,2-dicarboximide, tested as in (C) at 0.5 and 0.75 wt. %, with up to 300 hours exposure, controlled test organisms as follows: Staph. aureus—2.5–3.5 mm inhibition/N; K. pneumoniae—0.5–2 mm inhibition/N; Stv. reticulum—4–6 mm inhibition/NS; mixed fungi— 0.3 mm inhibition/N (with large zone of inhibition of Aspergillus niger).

Captan, cis-N-[(trichloromethyl)thio]-cyclohexene-1,2-dicarboximide, tested as in (C), at 0.5–1.05 wt. %, controlled test organisms as follows: Staph. aureus—0.5–3.5 mm inhibition/N; K. pneumoniae—0–1 mm inhibition with no growth in the contact area after 200 hours of exposure, but growth occurring after 300 hours; Stv. reticulum—0.5–4 mm inhibition/NS; mixed fungal spore —0–5 mm inhibition/N. Inhibition of fungal growth dropped sharply with exposure. Captan, however, caused yellowing of polyvinyl chloride films after exposure. Unweathered films containing Captan at greater than 0.5 wt. % exhibited surface blooming, that is, formation of white powder on the surface, believed to be Captan. No powder was seen on the surfaces of weather-exposed films; however such may have been washed off during the exposure treatment.

METHOD OF FORMULATIONS

For use as plastics or polymer biocides, the compounds disclosed herein may be incorporated in plastics or films or products made therefrom, in an amount ranging from 0.001 to 2.0% by weight of the total composition, preferably 0.01 to 1.0, and most preferably 0.01 to 0.5% by weight. The incorporation may be performed, as was done in the examples, by incorporating an amount of the biocide in a dry mix which is then processed to produce the desired plastic or polymer or ultimate product containing it. Alternatively, the biocide may be incorporated in a dry blend at a higher rate, for instance, 12–13% by weight, to which a small amount of an extrusion aid (for instance barium-calcium stearate) is added, and the blend extruded to form a rod, from which pellets are cut, as described for instance in U.S. Pat. No. 4,086,297. The pellets can then be utilized as a means to incorporate the biocide into subsequent plastic or polymer formulations, with the number of pellets added being determined so as to produce an overall polymer composition including the biocide in the desired or appropriate amount.

More commonly, the antimicrobial compound is predissolved or dispersed in a liquid carrier solvent such as a plasticizer for a polymeric resin, "see for instance U.S. Pat. No. 3,288,674", thereby providing a vehicle for the biocide for ease of incorporation and to promote its migration throughout the resin, particularly to its surface. Usually, the biocide is dissolved in a first solvent and then diluted with the desired resin-compatible plasticizer second solvent to provide a final liquid solution wherein the first solvent acts as a coupling solvent for the biocide and plasticizer to maintain homogeneity. Both first and second solvents are themselves mutually compatible with each other and the polymeric resin system. See, for instance, U.S. Pat. No. 3,288,674.

For treatment of cellulosic, plastic or polymeric fibers, or fabrics made therefrom, the biocide is applied as a coating by standard methods such as brushing, dipping or spraying, with subsequent drying, in an amount similar to that utilized for plastics and polymers.

What is claimed is:

1. A plastic or film composition other than a paint comprising a polymer and further comprising a microbiocidally effective amount of a compound having the formula

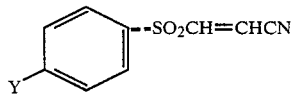

in which Y is hydrogen, halogen or methyl.

2. A composition according to claim 1 in which Y is methyl.

3. A composition according to claim 1 in which Y is chloro.

4. A composition according to claim 1 in which Y is fluoro.

5. A composition according to claim 1 in which Y is hydrogen.

6. A composition according to claim 1 in which the compound is present in an amount of from about 0.001 to about 2.0 percent by weight.

7. A composition according to claim 1 in which the compound is present in an amount of from about 12 to about 13 percent by weight.

8. A composition according to claim 1 comprising polyvinyl chloride.

9. A composition according to claim 8 in which Y is methyl.

10. A dry blend and articles made therefrom, for use as a microbocidal additive for synthetic plastic or polymer compositions comprising a compound having the formula

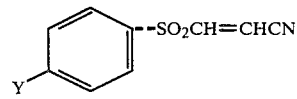

in which Y is hydrogen, halogen or methyl, in an amount of from about 12 to about 13% by weight, and an extrusion aid.

11. A method for protecting a plastic or film-forming polymer composition other than a paint, which composition is fabricated into a continous form, against attack by bacteria, fungi or actinomycetes, comprising incorporating into said composition or continuous form, a microbiocidally effective amount of a compound having the formula

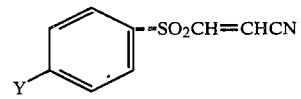

in which Y is hydrogen, halogen or methyl.

12. A method according to claim 11 in which Y is methyl.

13. A method according to claim 11 in which Y is chloro.

14. A method according to claim 11 in which Y is fluoro.

15. A method according to claim 11 in which Y is hydrogen.

16. A method according to claim 11 in which the compound is included in the continuous form in an amount of between about 0.001 and about 2.0 percent by weight.

17. A method according to claim 11 in which the compound is included in the plastic or polymer in an amount of from about 12 to about 13 percent by weight.

18. A method according to claim 11 in which the plastic or polymer is polyvinyl chloride.

19. A method according to claim 18 in which Y is methyl.

* * * * *